United States Patent
Boll

[15] 3,665,739
[45] May 30, 1972

[54] ANTI-THEFT DEVICE

[72] Inventor: William E. Boll, 909 Tiller Way, Corona Del Mar, Calif. 92625

[22] Filed: Jan. 18, 1971

[21] Appl. No.: 107,013

[52] U.S. Cl.....................................70/237, 70/229, 70/260
[51] Int. Cl.............................................E05b 65/12
[58] Field of Search..................70/14, 18, 58, 177, 180, 200, 70/227, 229, 230, 237, 258, 259, 260, 261

[56] References Cited

UNITED STATES PATENTS

| | | | |
|---|---|---|---|
| 1,179,671 | 4/1916 | Smith | 70/260 UX |
| 1,586,298 | 5/1926 | Eaton | 70/230 X |
| 1,642,576 | 9/1927 | Cannam et al. | 70/229 X |
| 1,799,593 | 4/1931 | Lavender | 70/260 |

Primary Examiner—Albert G. Craig, Jr.
Attorney—Miketta, Glenny, Poms & Smith

[57] ABSTRACT

An anti-theft device for releasably locking an internal combustion engine of a land vehicle to a mating transmission by substitution of the device for one of the conventional bolts which secure the transmission housing to the engine housing thus preventing the separation of the engine and transmission by the mere removal of the conventional bolts which secure these components together. The device is disclosed for use in releasably locking together the engine and transmission of a Volkswagen automobile.

6 Claims, 4 Drawing Figures

Patented May 30, 1972 3,665,739
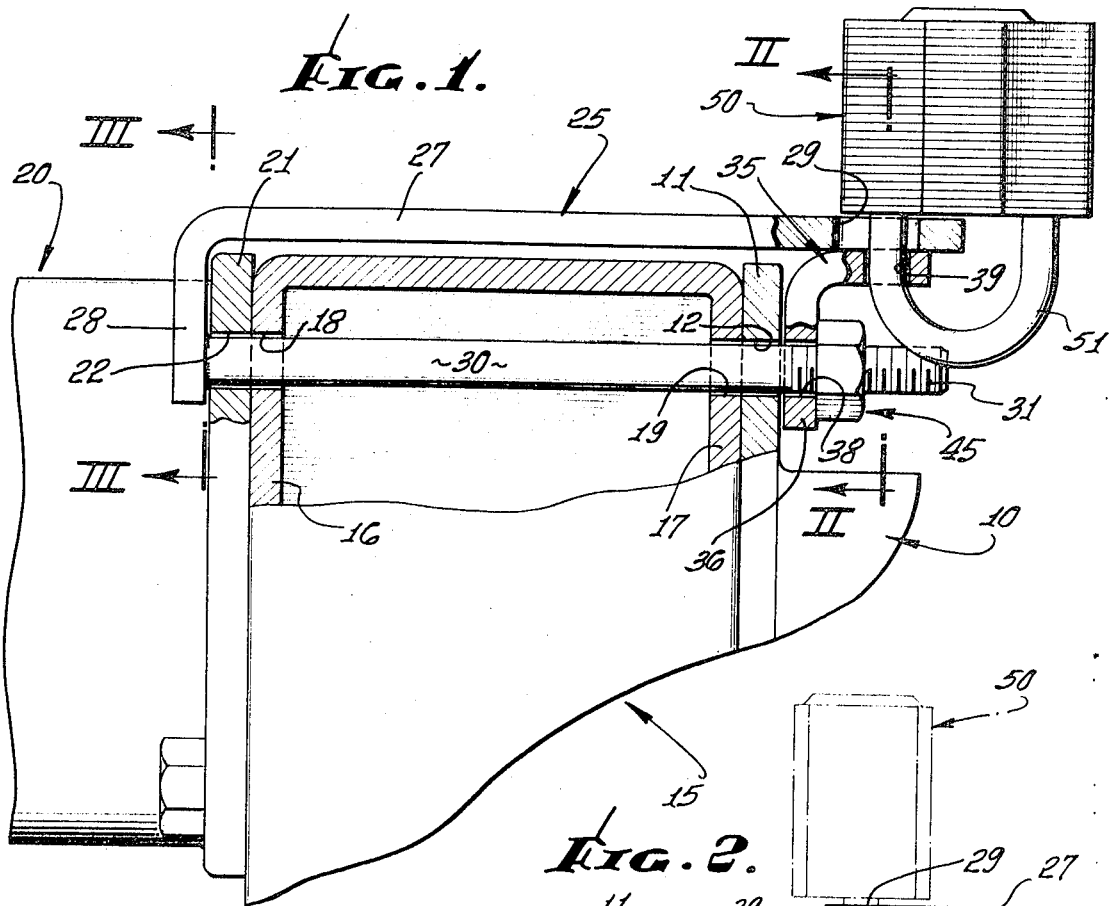
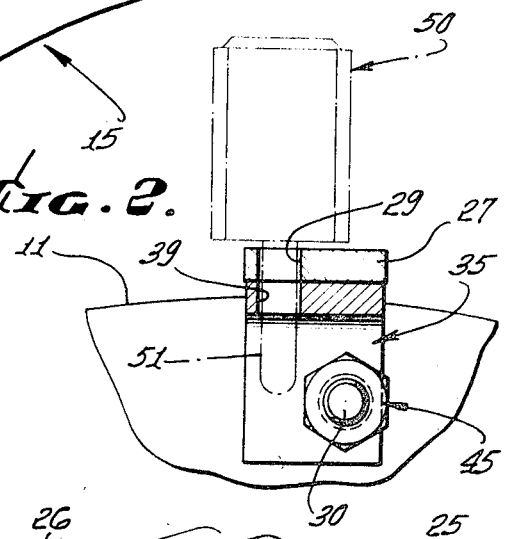
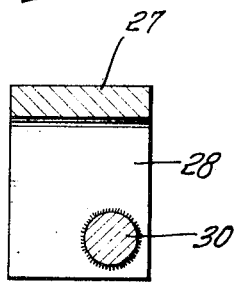
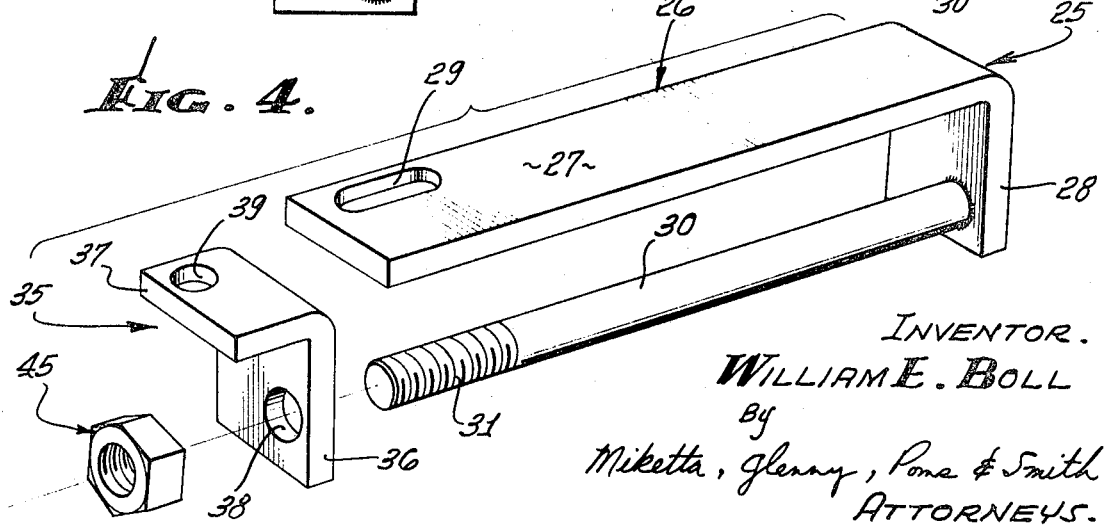
INVENTOR.
WILLIAM E. BOLL
By
Miketta, Glenny, Poms & Smith
ATTORNEYS.

3,665,739

ANTI-THEFT DEVICE

BACKGROUND OF THE INVENTION

In the last 5 or 10 years, there has been a great interest in recreational off-road vehicles such as dune buggies, motorcycles, all terrain vehicles, etc. Dune buggies are vehicles which are often built by the owner using components from production automobiles, modified and combine with special equipment, to provide the performance required in off-road use. One popular automobile used extensively in home-building of dune buggies is the Volkswagen model commonly known as the "Beetle." In particular, the small, light-weight, air-cooled internal combustion engine of the Volkswagen has been used extensively as the power source for dune buggies.

An unfortunate concomitant of this popularity has been an alarming rate of thefts of these automobiles, and more often, of the engine alone. The VW engine is located in the rear of the chassis and is primarily connected to the remainder of the vehicle by four elongated bolts which interconnect the engine with the mating transmission. Upon removal of these four bolts, there is only minor attachments which must be released before the engine may be removed. Since the engine is extremely light-weight, it is easy for two persons to transport the engine away from the automobile.

Due to the ease with which the engine may be disconnected and removed from a VW automobile together with the popularity of such engine for off-road use, the rate of theft of such engines has increased with disappointing speed.

SUMMARY OF THE INVENTION

Accordingly, it is a general object of this invention to prevent the theft of automobile internal combustion engines.

It is another object of the present invention to provide an anti-theft device for releasably securing an automobile engine to its mating transmission including a conventional padlock.

Still another object of the present invention is to provide an anti-theft device which is inexpensive to manufacture, simple to install, and relatively impervious to tampering or jimmying.

Generally, in accordance with an exemplary embodiment of the present invention, the anti-theft device is adapted for use in releasably securing an automobile engine to a mating transmission, the transmission having a housing with a plurality of the bolt-holes disposed in the peripheral portion thereof and in registry with bolt-holes provided in flanges integral with the engine housing, the device comprising a U-shaped member having one long leg projecting through and out of said bolt-holes and having threads on the free end and the other long leg positioned exteriorly of said transmission housing and having an opening near its free end, an L-shaped member having a leg perpendicular to the U-shaped member long leg and having an opening for receiving the threaded portion of the u-shaped member long leg therethrough and the other leg lying adjacent and parallel to the other long leg of said U-shaped member and having an opening therein in registry with the opening in the free end of the other long leg of the U-shaped member for receiving the shackle of the padlock therethrough to releasably secure the L-shaped and U-shaped members together forming a loop, and a nut received on said threaded portion of said long leg of said U-shaped member, exterior of said L-shaped member perpendicular leg, and clamping said transmission and engine housings together between said L-shaped and U-shaped member.

DESCRIPTION OF THE DRAWING

FIG. 1 is a side elevation view of an exemplary embodiment of an anti-theft device constructed in accordance with the present invention shown in position for locking together the starter, transmission and engine of a Volkswagen automobile;

FIG. 2 is a cross-sectional view taken along the plane II—II of FIG. 2;

FIG. 3 is a cross-sectional view taken along the plane III—III of FIG. 1; and

FIG. 4 is an exploded perspective view of the device shown in FIG. 1.

DETAILED DESCRIPTION OF THE PREFERRED EMBODIMENT

Referring now to the drawing, there is shown an exemplary embodiment of an anti-theft device for releasably locking an internal combustion engine of a land vehicle to a mating transmission in accordance with the present invention. With reference to FIG. 1, there is shown a portion of a conventional Volkswagen engine and drive train which is used for an exemplary illustration of the manner is which the anti-theft device of the present invention is constructed and operates. It will of course be appreciated that the device, with modifications apparent to those having ordinary skill in the art, could be used in connection with any internal combustion engine and transmission which has a generally similar configuration as that disclosed herein. More specifically, only a small portion of the engine 10 is shown which has a plurality of marginal flanges integral with the engine block such as the flange 11. Flange 11 has a bolt hole 12. Adjacent to the engine block housing is the transmission 15 which is also only partially shown to disclose that the transmission has opposed walls 16 and 17 which are generally parallel with the marginal flanges 11 of the engine block and have both holes 18 and 19 in the peripheral portions of the transmission housing. It will be seen that the bolt holes 18, 19 are aligned or in registry with the bolt hole 12 in the engine block. The transmission may support an electric starting motor shown at 20 which is secured to the transmission by one or more bolts and has a flange 21 which includes a bolt hole 22 that is in registry with the bolt holes 18, 19 in the transmission and bolt hole 12 in the engine block.

In the mating of the transmission to the internal combustion block in a conventional Volkswagen automobile, there are four registered bolt holes between the transmission and the engine block and each of these bolt holes accept a standard bolt for securing the transmission and engine together. The device of the present invention is adapted to be substituted for one of these conventional bolts to preclude the easy detachment of the transmission from the engine by simply removing the four bolts and is adapted to do so without any modification of the transmission, engine housing, or starting motor.

Generally, the anti-theft device of the present invention comprises a U-shaped member indicated generally at 25, an L-shaped member indicated generally at 35, a nut 45 and a padlock 50.

The U-shaped member 25 includes an L-shaped hard steel strap 26 including a long leg 27 and a short leg 28 generally perpendicular to at least a portion of long leg 27. At the free end of the long leg 27 there is provided an opening 29 for receiving the shackle of the padlock 50. Opening 29 is preferably laterally offset from the longitudinal center line of the strap 27 for purposes to be described hereinafter. It will be seen that the opening 29 is elongated so that the L-shaped member 35 may be longitudinally adjusted as will be seen from the following description.

The U-shaped member also includes a shaft 30 having a length which preferably, but not necessarily, is substantially equal to the length of the long leg 27 of the metal strap and generally parallel thereto. One end of the shaft 30 is permanently affixed, by welding or the like, adjacent the free end of the short leg 28 of the strap. The opposite end of the shaft 30 is threaded at 31 for purposes to be described As seen best from FIG. 2, the shaft 30 is laterally offset from the longitudinal center line of the strap 26 in a direction opposite from the direction in which the opening 29 was laterally offset. It should be understood that the length of the short leg 28 of the strap 26 depends upon the distance between the bolt holes in the engine and/or transmission and the outer surface of the transmission since the spacing between the shaft 30 and long leg 27 must be adequate to accommodate the distance between the center line of the bolt holes and the outer surface of the transmission, as seen in FIG. 1.

The anti-theft device of the present invention also includes the L-shaped member 35 which is also formed from hard steel and includes two relatively short legs. One leg 36 is substantially equal to the length of short leg 28 on the first L-shaped strap 26 and the other leg 37 maybe of the same length. The leg 36 has an opening or hole 38 for receiving the free end 31 of the shaft 30 of the U-shaped member 25. The other leg 37 has an opening 39 which, when the device is assembled, is in registry with the opening 29 in the long leg 27 of the L-shaped member 26. It will be noted that the hole 38 in leg 36 is laterally offset from the longitudinal center line of the U-shaped member so as to receive the end of the shaft 30 and the opening 39 in the shorter leg 37 is also offset in the opposite direction so that it may be in registry with opening 29.

The device also includes a nut 45 which may be threadably received on the end of shaft 30 of the U-shaped member. The device further includes a conventional padlock 50 having a shackle 51 which is standard in form and construction. The padlock 50 may be opened by a key, combination, or the like.

The device is shown assembled in FIG. 1, where it will be that the shaft 30 of U-shaped member 25 projects through the opening 22 in the flange of the starter motor 20 through the opening 18 in wall 16 of the transmission 15, through opening 19 in the other wall 17 of the transmission, and through the opening 12 in the integral flange 11 of the engine block housing 10. It will be apparent that the shaft 30 has a length which allows the free end 31 thereof to project beyond the bolt holes. When the shaft 30 is inserted through these bolt holes, the strap 27 passes over the exterior surface of the transmission, the end of the flange of the starting motor, and the edge of the engine marginal flanges. The smaller L-shaped member or strap 35 is then assembled by fitting the opening 38 in leg 36 over the end of shaft 30 and then threading nut 45 onto the end of shaft 30 and tightening the nut so as to clamp together the starter, transmission and engine between the legs 28 and 36 of the device. The shackle 51 of the padlock 50 is then inserted through the registered openings 29 and 39 of the U-shaped member and small L-shaped strap, respectively, and is then locked as shown in FIG. 1. Preferably, the padlock may be inverted so that the key opening will project upwardly to facilitate access for removal of the padlock. It will now be seen that the device securely locks the transmission and internal combustion engine together to prevent the easy and rapid detachment by removal of bolts as occurs in the conventional means for securing the transmission and engine together. It will further by appreciated that even if the nut 45 could be removed from the end of the shaft 30 the U-shaped member 25 in combination with the L-shaped member 35, secured together by the lock, forms a closed loop which cannot be detached because the opening 38 in the leg 36 of the L-shaped member 35 cannot be slid off the end of the shaft 30 of the U-shaped member due to its length.

It will thus be seen that the anti-theft device of the present invention provides means for securing the engine block to the mating transmission without modification while allowing these components to be clamped together as required for proper mating and yet prevents unauthorized detachment of these components. Of course, removal of the padlock allows the components to be easily detached when required. From the foregoing description of the exemplary embodiment it will be seen that modifications, alterations and variations of the device may be made by persons skilled in the art which come within the scope of the present invention.

I claim:

1. An anti-theft device for releasably locking an internal combustion engine of a land vehicle to a mating transmission, the transmission having a housing with a plurality of bolt holes disposed in the peripheral portion thereof and the engine having a plurality of registered bolt holes in marginal flanges integral with the engine block, comprising:
   an L-shaped hard steel strap having an opening at the free end of the long leg for receiving the shackle of a padlock;
   a shaft fixedly secured at one end at the free end of the short leg and extending generally parallel to said long leg, said shaft having threads at the free end thereof, said shaft receivable in one of said engine and transmission housing registered bolt holes and having a length so as to project therefrom;
   a second L-shaped hard steel strap, one leg thereof having a hole for receiving the free end of said shaft and the other leg having an opening in registry with the opening in the free end of the long leg of said first strap for receiving the padlock shackle; and
   a nut threadably received on said shaft exterior of said second strap leg for clamping said transmission and engine housing between said strap legs.

2. The device of claim 1 wherein said shaft is laterally spaced in one direction from the longitudinal center line of said first strap, and the registered openings in said first and second straps for receiving the padlock shackle are laterally offset in the opposite direction.

3. The device of claim 2 wherein said opening in the free end of the long leg of the first strap is elongated in the longitudinal direction to accommodate varying distances between the strap legs.

4. A device for preventing theft of an engine of a land vehicle by releasably locking the engine to its mating transmission without any modification of the engine or transmission housing, the engine and transmission housing having a plurality of registered bolt holes each of which normally carries elongated conventional threaded bolts, the present device being substituted for one of the bolts and comprising:
   a U-shaped member, one leg of said member comprising a threaded shaft receivable in said bolt holes and projecting therefrom, the other long leg extending exteriorly of said transmission housing, parallel with said shaft, and having an opening near the free end thereof;
   an L-shaped member having one leg generally perpendicular to said shaft and having an opening for receiving the portion of said threaded shaft projecting from the registered boltholes, the other leg being parallel to said other long leg of said U-shaped member and having an opening in registry with said opening in said other long leg of said U-shaped member for receiving therethrough the shackle of a padlock; and
   a nut threadably received on said shaft exterior of said L-shaped member perpendicular leg.

5. The device of claim 4 wherein said U-shaped member opening in said other long leg is elongated in the longitudinal direction.

6. The device of claim 4 including said padlock.

* * * * *